May 23, 1933.  H. E. MALZARD  1,910,706
PIPE OR HOSE COUPLING
Filed June 10, 1932  2 Sheets-Sheet 1

Inventor
HERBERT E. MALZARD.

By Edwin N. Clarkson
Attorney

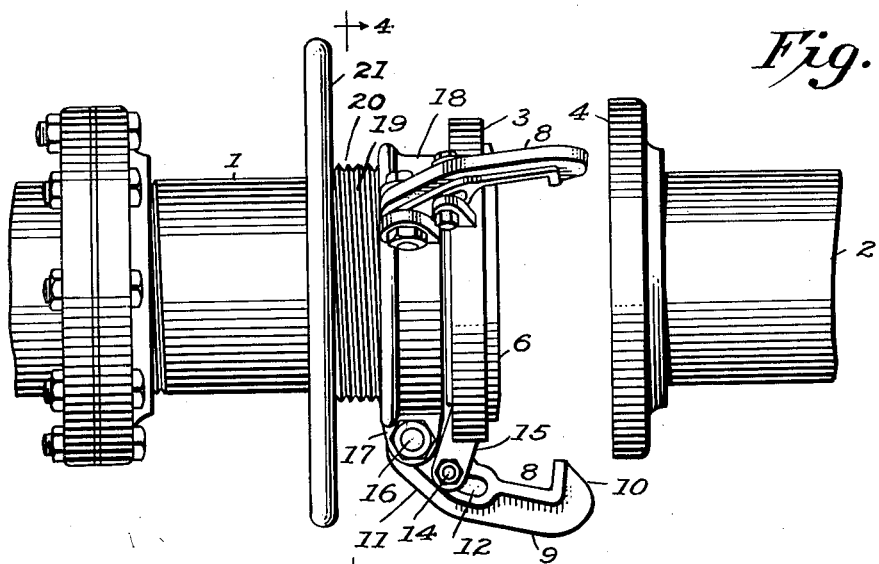
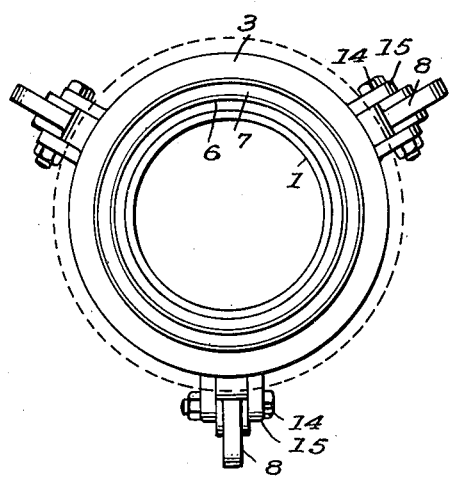
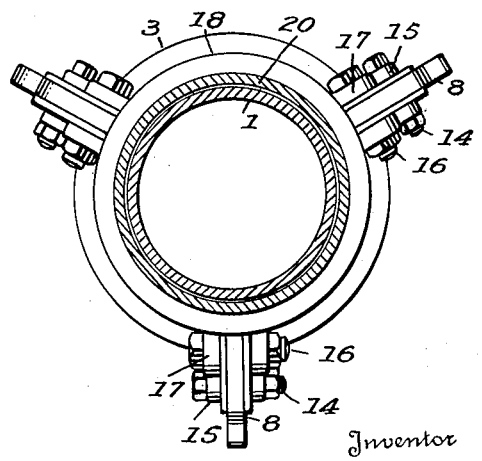
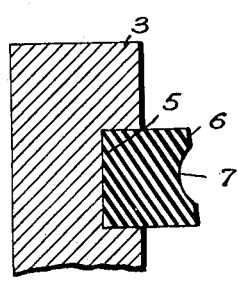

Patented May 23, 1933

1,910,706

UNITED STATES PATENT OFFICE

HERBERT E. MALZARD, OF PORTLAND, MAINE, ASSIGNOR TO HERCULES COUPLING COMPANY, A CORPORATION OF MAINE

PIPE OR HOSE COUPLING

Application filed June 10, 1932. Serial No. 616,550.

This invention relates to a pipe or hose coupling especially adapted for use in connection with oil tankers, but also adapted for general use in making a secure and fluid-tight connection between two conductors.

One object of the invention is to provide a coupling which is readily and quickly operable for a coupling and uncoupling action, and which will automatically center the parts coupled in the coupling action.

Another object is to provide a coupling one member of which carries pivotally and slidably mounted dogs to engage the other member, together with operating means for the dogs, whereby the dogs are adapted to center and tightly bind the parts in the coupling action and to be held against any possibility of a casual releasing action.

Still another object of the invention is to provide simple, reliable and efficient means for adjusting the dogs, whereby the coupling may be operated by one hand, allowing the other hand of the operator to be used for other work if desired or required, and to provide novel means for effectively sealing the joint between the coupling members.

An illustrative embodiment of the invention is shown in the accompanying drawings, in which:—

Fig. 2 is a side elevation of the coupling and the conductor to which it is applied, showing the coupling in release position.

Fig. 3 is an end elevation of the coupling member provided with the coupling dogs.

Fig. 4 is a cross-section on the line 3—3 of Fig. 2.

Fig. 6 is a detail view showing a feature of construction.

Figure 1:
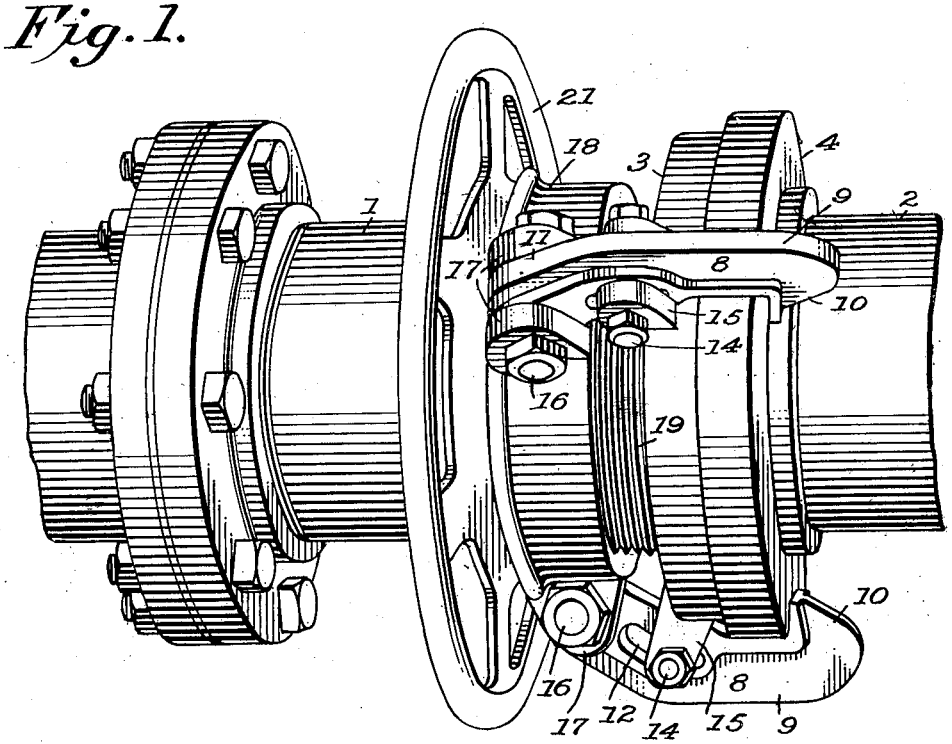
Fig. 1 is a perspective view showing the coupling as employed for coupling two fluid conductors.
Figure 5:
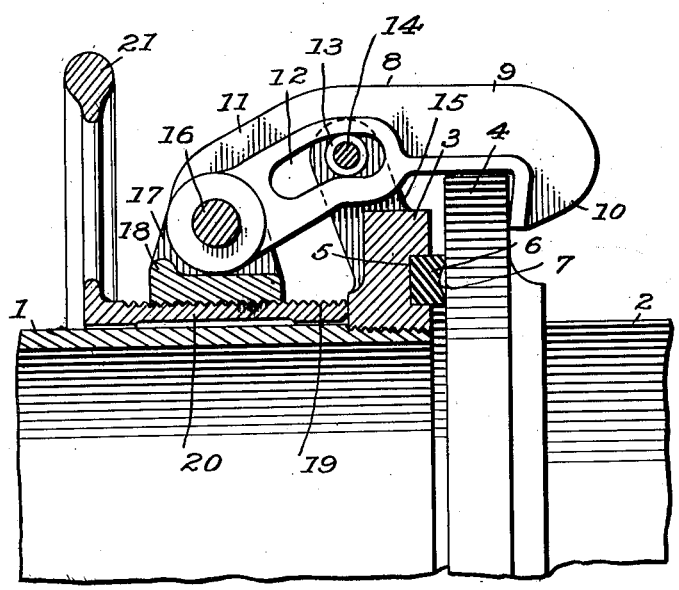
Fig. 5 is a longitudinal section through a portion of the coupled parts illustrated in Fig. 1, showing the dogs in coupling position.

While the coupler is adapted for general application, it is of special value when used for connecting a hose or pipe leading from an external oil tank to a pipe or conduit communicating with the interior of an oil tanker, in which use it is particularly important that the parts of the coupling may be easily and rapidly connected and that the coupling when made be absolutely fluid-tight. It is also important that the operations of connecting the parts be such as may be performed readily and quickly by one man, instead of several men, as is required in the use of many couplings, and so that one hand of the operator may be employed to adjust the coupler while the other hand of the operator may be employed to assist in such auxiliary adjustments as may be necessary.

Referring now more particularly to the drawings, 1 designates a portion of a pipe or conduit which may lead to the oil tank of a vessel or other tank, and 2 is a portion of a pipe or conduit, which may be a hose pipe, leading in practice from another tank, such as an oil supply or receiving tank located externally of the vessel. The ends of these pipes or conduits to be coupled are provided with coupling members 3 and 4, respectively, in the form of rings or flanges which may be threaded or otherwise secured upon the pipe ends. The confronting faces of said members or flanges 4 provide contact surfaces adapted to be brought together to effect a coupling engagement between the conduits and a sealing engagement which is absolutely fluid-tight. In the present instance the face of the member 3 is shown as provided with a groove or recess 5 in which is seated a resilient packing ring or gasket 6 of rubber or other suitable material having a projecting outer sealing face adapted for engagement with the face of the member or flange 4. The said outer face of the gasket 6 is preferably grooved, as at 7, and beveled in an outward direction, that is to say, between its inner and outer peripheral edges, so that in the act of drawing the flanges together the portion of the contact face of the gasket 6 on the inner side of the groove 7 will first be engaged by the flange 4 and such portion of the gasket compressed so that when a full seating contact between the faces of the gasket and the flange 4 is effected a sealing engagement is secured in which the compressed bearing surface increases progressively as the clamping pressure between the flanges 3 and 4 is increased, whereby an absolutely leak-proof seal between the coupled flanges is produced.

The coupling member or flange 3 is of somewhat less diameter than the coacting coupling member or flange 4 and forms a support for a plurality of coupling and locking dogs 8 adapted for engagement with the flange 4 to couple said flanges together. Each of these dogs is longitudinally of angular form presenting an outer locking arm 9 carrying a hooked locking end 10 and an inner supporting arm 11 extending inwardly at an obtuse angle to the arm 9. At the angle of intersection of its arms 9 and 11 each dog 8 is provided with an angular slot 12, conforming in angular shape to such portions of the arms. The slots 12 of the several dogs 8 are adapted to receive and engage anti-friction rolls 13 on bolts 14 coacting with the slots to pivotally and slidably connect the dogs with the member 3 for inward and outward radial swinging movements relative thereto and also for longitudinal sliding movements relative thereto and to the other parts of the coupling. The bolts 14 are carried by pairs of supporting lugs 15 projecting from the flange 3 at an outward and rearward angle, such as to properly dispose or position the bolts 14 to mount the dogs for such pivotal and sliding movements in a free and easy manner. The arrangement of the dogs is, therefore, such that the hooked end of the dogs may be swung outwardly and moved forwardly sufficiently beyond the flange 3 to permit the flange 4 to be properly disposed for coupling engagement with the flange 3, after which the dogs may be swung to bring their hooked ends 10 behind the flange 4 and the dogs to be moved rearwardly, as their hooked ends are swung inwardly, to draw the flange 4 into tight sealing engagement with the flange 3 and, in such operation, to center the flanges and the pipe members to which they are attached relative to each other, by which means an absolutely fluid-tight and accurate sealing engagement will be effected and the coupling members automatically and properly centered in the coupling action, doing away with the awkward and inconvenient necessity of hand adjusting the parts for a centering action, as is necessary in the use of many types of couplers.

The inner ends of the bolt arms 11 are provided with apertures for passage of bolts 16 which also pass through apertures in pairs of lugs 17 mounted on a shifting collar or ring 18 whereby the dogs are adapted to be operated for coupling and uncoupling actions. The ring 18 is of less diameter or radial extent than the flange 3 and the lugs 17 extend outwardly at right angles thereto to a less radial extent than the arms 15, by which arrangement, and the angular formation of the dogs, a compact construction and disposition of the coupling members is obtained and the shifting ring so arranged as to transfer the desired coupling and uncoupling movements to the dogs in a free and easy manner. The ring or collar 18 is internally threaded for engagement with the externally threaded surface 19 of an operating or shifting sleeve 20 which is suitably mounted for rotatable, but non-longitudinal, movements on the pipe 1, so that by rotation thereof in one direction or the other the rear collar 18, which is non-rotatable on the pipe and sleeve, may be longitudinally shifted to throw the coupling dogs into and out of action. For the purpose of enabling the sleeve 20 to be conveniently operated, a hand wheel or equivalent manipulating device 21 is provided which is rigid therewith. The sleeve 20 is disposed between the flange 3 and some suitable abutment on the pipe 1 to hold it from longitudinal movement while permitting it to have free rotation.

In the normal or uncoupled position of the dogs 8, the ring 18 lies in an advanced position, so that the dogs 8 are shifted forwardly with their hooked arms 9 swung outwardly owing to the controlling action of the cam or guide slots 12. The flange 3 is thus freely exposed so that the flange 4 of the hose or pipe member 2 may be brought into position for coupling engagement therewith. When this is done the hand wheel 21 is operated to move the ring or collar 18 rearwardly, thus transferring rearward sliding motion to the dogs 8, in which movement the dogs will also be swung on their pivots 14 and 16, through the controlling action of the pivots 14 and slots 12, to swing their hooked arms 9 inwardly. As a result of this combined rearward and inward swinging movement of the hooked ends of the arms, such ends of the arms will be brought into engagement with the rear surface of the flange 4 and caused to force said flange 4 toward flange 3 and into sealing engagement therewith, in which operation, also, the pipe member 2 and its flange 4 will be adjusted and properly centered axially with relation to pipe 1 and its flange 3, so that an automatic centering and clamping action will be effected. When the flange 4 is thus drawn by the action of the dogs into engagement with the flange 3 or the gasket 6 carried thereby, the pipe members will be coupled in a leak-proof manner and the dogs 8 will be held by the parts 18 and 20 against any possibility of releasing movement by vibration or otherwise, so that a positive coupling action will obtain as long as the parts 18 and 20 are in position for holding the dogs in coupling relation. By rotating the hand wheel 21 so as to force the ring 18 outward, the dogs will be slidably and pivotally shifted in an outward and forward direction to move their hooked ends 10 out of engagement with the flange 4 so as to release the pipe section 2, as will be readily understood.

From the foregoing description, taken in connection with the drawings, the construction and mode of operation of my improved coupling will be readily understood, and it will be seen that the invention provides a coupling for fluid lines and the like which will connect the conduit section in an absolutely leak-proof manner when they are coupled together and that an absolutely secure connection will be obtained against any possibility of casual loosening or disconnection of the coupled parts. The means for operating the dogs, and the construction of the dogs themselves, permits of the coupling action being effected by a single operator, and of such operator adjusting the dogs for coupling or releasing action by the use of one hand only, leaving his other hand free to assist in conducting other manipulations that may be necessary. My improved coupling is of further advantage in having no loose parts liable to be lost or mislaid and in being so simple in construction and operation as to enable coupling and uncoupling actions to be easily and quickly effected and without the necessity of employing a plurality of operators, as is required with some types of construction of couplings of this character heretofore in use.

While the construction herein disclosed is preferred, it will, of course, be understood that changes in the form, proportion and arrangement of parts may be made, within the scope of the appended claims, without departing from the spirit or sacrificing any of the advantages of the invention.

What I claim is:—

1. A pipe coupling comprising a pair of coupling members having contact portions, one of said members carrying pivot pins, coupling dogs having longitudinal slots therein engaging said pivot pins and pivotally and slidably mounting the dogs on said member for radial and longitudinal movements to engage the other coupling member and draw the members together and to center them in the drawing action, and means for imparting motion to the dogs for coupling and uncoupling actions and to retain the dogs in coupling position.

2. A pipe coupling comprising a pair of coupling members having contact portions, one of said members carrying pivot pins, angular coupling dogs having elongated slots engaging said pins to mount the dogs for longitudinal and radial movements on said member, said dogs having hooked ends to engage the other member, and means for imparting motion to the dogs for coupling and uncoupling actions and to retain the dogs in coupling position.

3. A pipe coupling comprising a pair of coupling members having contact portions, one of said members carrying pivot pins, coupling dogs having longitudinal slots therein engaging said pivot pins and pivotally and slidably mounting the dogs on said member for radial and longitudinal movements to engage the other coupling member and draw the members together and to center them in the drawing action, a sleeve on the dog carrying member, said sleeve having pivotal connections with the dogs and longitudinally movable but non-rotatable on said member, and means for adjusting the sleeve.

4. A pipe coupling comprising a pair of coupling members having contact portions, one of said members carrying pivot pins, angular coupling dogs having elongated slots engaging said pins to mount the dogs for longitudinal and radial movements on said member, said dogs having hooked ends to engage the other member, a sleeve on the dog carrying member, said sleeve having pivotal connections with the dogs and longitudinally movable but non-rotatable on said member, and means for adjusting the sleeve.

5. A pipe coupler comprising a pair of coupler members having contact portions, dogs having angularly related front and rear arms for coupling said members together, said dogs being provided with corresponding angular slots intersecting both arms and the front arms of the dogs having hooks to engage one of the coupling members, means on the other coupling member slidably engaging the slots in the dogs to support said dogs for longitudinal sliding and radial swinging movements on said member, and means for imparting motion to the dogs for coupling and uncoupling actions and to retain the dogs in coupling position.

6. A pipe coupler comprising a pair of coupler members having contact portions, dogs having angularly related front and rear arms for coupling said members together, said dogs being provided with corresponding angular slots intersecting both arms and the front arms of the dogs having hooks to engage one of the coupling members, a sleeve on the other coupling member provided with means engaging the slots in the dogs and mounting said dogs for longitudinal sliding and radial swinging movements, and means for adjusting the sleeve.

In testimony whereof, I affix my signature.

HERBERT E. MALZARD.